US006282104B1

(12) United States Patent
Kern

(10) Patent No.: US 6,282,104 B1
(45) Date of Patent: Aug. 28, 2001

(54) DC INJECTION AND EVEN HARMONICS CONTROL SYSTEM

(75) Inventor: Gregory A. Kern, Louisville, CO (US)

(73) Assignee: Applied Power Corporation, Waltham, MA (US)

( * ) Notice: Subject to any disclaimer, the term of this patent is extended or adjusted under 35 U.S.C. 154(b) by 0 days.

(21) Appl. No.: 09/525,098

(22) Filed: Mar. 14, 2000

(51) Int. Cl.[7] ........................................ H02M 7/48
(52) U.S. Cl. .......................... 363/34; 363/37; 363/40; 363/95
(58) Field of Search ........................... 363/34, 37, 39, 363/40, 95, 131

(56) References Cited

U.S. PATENT DOCUMENTS

| 4,977,492 | * | 12/1990 | Kirchberg et al. | 363/37 |
| 4,994,956 | * | 2/1991 | Kirchberg et al. | 363/95 |
| 5,001,619 | * | 3/1991 | Nakajima et al. | 363/96 |
| 5,001,622 | * | 3/1991 | Kirchberg et al. | 363/95 |
| 5,047,909 | * | 9/1991 | Hosoda | 363/40 |
| 5,235,503 | * | 8/1993 | Stemmler et al. | 363/39 |
| 5,327,335 | * | 7/1994 | Maddali et al. | 363/39 |
| 5,377,092 | * | 12/1994 | Rowand et al. | 363/39 |
| 5,383,107 | * | 1/1995 | Hopkins et al. | 363/41 |
| 5,526,252 | * | 6/1996 | Erdman | 363/41 |
| 5,559,689 | * | 9/1996 | Kirchberg et al. | 363/95 |

* cited by examiner

Primary Examiner—Jeffrey Sterrett

(74) Attorney, Agent, or Firm—Thomas C. Folsom; Chrisman Bynum & Johnson

(57) ABSTRACT

A control system is provided for positioning between a power source, such as a distributed generator, and a utility or utility grid to control the injection of dc current and even harmonics into the utility or utility grid. In one embodiment, the control system is particularly suited for grid-tied operation and includes a power converter for acting as an ac current source by converting power received from the power source to ac current for transmittal to the utility. The control system further includes a voltage transformer between the power converter and the utility connection to block dc current and isolate the power source from the utility. A feedback control loop is included in the control system to measure, with a pair of current transformers, dc current and even harmonics in the current flowing into (power converter side) and out (utility side) of the voltage transformer. A signal combiner is used to combine the outputs of the two current transformers such that its output to a harmonic analyzer of the feedback control loop represents the load current of the voltage transformer. The harmonic analyzer determines the magnitude and phase of the second harmonic of this load current and transmits this as output to a controller of the feedback control loop. The controller creates a control signal that it transmits to a reference device connected to, or integrated with, the power converter which creates a reference signal having a dc offset that functions to substantially zero out the linearized second harmonic magnitude. The reference signal is used to control the operation and output of the power converter to substantially eliminate dc current injection into the voltage transformer which in turn effectively limits the amplitude of even harmonics in the current supplied to the utility.

28 Claims, 12 Drawing Sheets

DC INJECTION AND EVEN HARMONICS CONTROL SYSTEM

BACKGROUND OF THE INVENTION

1. Field of the Invention

The present invention relates generally to a system for monitoring and controlling current flow between an alternating current (ac) power source and a utility or utility network and more particularly, to a control system for controlling the amount and magnitude of direct current (dc) and even harmonics current injected with ac supplied to a utility from an ac power source, such as a distributed generator.

2. Description of the Related Art

Distributed generators, particularly non-dispatchable generators, are increasingly being connected to utility grids to allow these remotely located generators to contribute electrical power to the utility rid to meet power demands and to meet electric consumers demands for alternate sources of power. Common distributed generators utilize dc power sources, such as fuel cells, batteries, photovoltaics (i.e., solar power), and wind power (when rectified) to produce the power to be supplied to the utility grid. To provide ac current to the utility grid, a power converter, e.g., dc/ac inverters, is typically connected between the dc power source and the utility grid. When the included power converter is static, the power converter is typically designed to operate as an ac current source.

Recently, the Institute of Electrical and Electronic Engineers (IEEE) enacted IEEE Standard 929-2000 which imposes limits on the magnitude of harmonic currents and dc currents that may be injected into a utility by a distributed generator or from a utility customer's premise. These limits are much stricter than previous limits and compliance with these limits is a significant concern within the distributed energy industry. Particularly, these new standards state that the amount of dc current injected into the utility by the distributed generator cannot exceed 0.5 percent of the distributed generator's output current rating. Further, the new standards for injected even harmonics require that the second harmonic current be kept less than 1 percent of the output current rating of the distributed generator or ac power source. These standards require that the distributed generator function as a substantially sinusoidal ac current source with a low harmonic content (as specified by IEEE 929).

Stricter limits were included in the new IEEE standard because small amounts of dc current injection and/or higher levels of even harmonic current can quickly and seriously damage utility equipment. The type of equipment most affected are step-down transformers which lower the voltage from the utility power lines to voltages suitable for use in electric consumer residences and in business facilities. To better understand the difficulties of meeting these standards, it may be helpful to understand how dc current injection relates to or effects even harmonics. When dc current is injected into a transformer, regardless of whether the current comes from the primary or secondary, the transformer draws even harmonics from the side of the transformer supplied by a voltage source. It takes only a small amount of dc current injection to cause the transformer to exceed the IEEE 929 limits for even harmonics. In a transformer isolated distributed generator dc current injected into the transformer from the power converter side is blocked by the transformer from passing or coupling through to the utility side of the transformer. In this regard, a voltage transformer can be used to protect the utility and its equipment from dc current injection, however, the voltage transformer by itself does not solve the problem of large even harmonic amplitudes which the utility and its transformers will see. Additionally, another, more subtle problem with the use of transformers to isolate distributed generators and connected power converters is that a power converter, such as an inverter, can become or appear to be a source of even harmonics when dc current is injected into the transformer from the utility side, even if the power converter itself is not a source of dc current injection.

The distributed power generation industry has tried, with only limited success, a number of approaches to controlling dc current injection into utilities, but none of the approaches provides a method of controlling even harmonics that satisfies the new and stricter IEEE standards for protecting utility equipment. One control approach used by manufacturers in the industry is to include a voltage transformer in the output circuit of their power generator downstream of a power converter. Under the previous standards, this approach was useful for addressing the dc current injection problem as the transformer blocked the dc current output by the power converter. Unfortunately, as discussed above, the transformer draws even harmonics from the utility at magnitudes that exceed the new IEEE standards even at relatively low levels of dc current injection.

Another industry control approach is to embed a magnetic field sensor into the transformer to measure dc current flux and adjust the power converter, i.e., inverter, current output to zero the measured dc flux. This technique was used in the mid-1980s, but it proved expensive to embed magnetic field sensors into transformers. Additionally, such sensors have inherent problems with drift that develops over time. Drift in the measurement of a dc current generates inaccuracies in attempting to control or adjust that dc current to zero magnitude.

Some efforts were made to control dc current injection by measuring the dc injection current with a resistive shunt and amplifier and then using this measurement to adjust the power converter to obtain a desirable current output. However, since the dc current has to be controlled per the new IEEE standards to less than 0.5 percent of the ac current output from the generator, it is difficult to filter the relatively small dc current from the relatively large ac current signal. Additionally the resistive shunt is typically at a potential other than ground which leads to problems in measuring a small dc voltage in the presence of a substantial common mode voltage. As with the magnetic field sensor approach, even small offsets or errors in the measurement of dc current makes it unlikely that the control system will be able to zero out the dc current to satisfy the new IEEE dc current injection standards.

Yet another control system places large capacitors in series between the power converter connected to the generator and the transformer. The capacitors are effective in blocking dc current from getting into the transformer (and, thereby, avoiding drawing in even harmonics) but at a significant cost. A half bridge inverter is a topology that places the transformer in series with the dc blocking and storage capacitors but is not necessarily the most cost effective approach.

Prior to the adoption of the new IEEE standard, many manufacturers in the industry tried to address the injection problems by relying upon the use of high quality components with minimal drift and accurate microprocessor control of the power converter waveform to minimize dc current injection into the isolating transformer. Unfortunately, although dc current injection could be relatively effectively controlled in this manner even harmonic current injection is typically not kept within the new, stricter IEEE 929 limits.

Consequently, there remains a need for an improved control system for use with ac power sources, such as distributed generators, connected to utilities and/or utility grids to maintain dc current injection and even harmonic current injection below specified levels to minimize the risks of damaging utility equipment and preferably that maintains levels below the newly enacted IEEE 929 standard.

SUMMARY OF THE INVENTION

The dc injection and even harmonics control system according to the present invention is useful in a large variety of power distribution systems that typically include a power source with an ac output-type power converter that supplies power to either a utility grid in a utility interactive operating mode (i.e., acts as an ac current source) or to ac loads in a standalone operating mode (i.e., acts as an ac voltage source) or both. The control system is advantageously configured and has a number of features that will be described in detail in the following discussion that prevent transformer saturation, control dc current injection, and minimize even harmonic currents. The control system is especially useful in allowing users, such as individuals and power company personnel connecting a distributed generator to a utility, in successfully complying with the new, stricter requirements of IEEE Standard 929 that limit even harmonic current amplitudes and the dc current magnitude that can be injected into a utility or utility grid. More particularly, the control system of the invention typically controls operation of an included power converter connected to a utility and/or ac loads via a voltage transformer (included to block dc current injection) in a manner that better controls even harmonic current injection to the utility.

The operation of the control system provides improvements over the use of resistive shunts or hall effect current sensors to try to control dc current injection transformer saturation, and even harmonics because these devices and their corresponding amplifiers are subject to dc drift over time and temperature fluctuations (e.g., provides differing levels of control at different temperatures as component values change with temperature). In several preferred embodiments, the control system includes ongoing, nearly continuous feedback control or calibration to resist or even be immune to the drift problems experienced with prior control devices. Additionally as will become clear from the following discussion, the control system functions to effectively cancel out dc current injection that enters the included voltage transformer. The control system also meets the needs of users by being designed for relatively inexpensive installation and operation. For example, in a power distribution system having, a power source with a power converter connected to the outlet, the existing power converter with a microprocessor (e.g., controller) having an extra analog to digital channel (i.e., a/d channel) can be reconfigured quickly by additional programming (to provide dc offset adjustments) and with the addition of a current transformer and a resistor (to provide feedback control for performing the dc offset adjustments) to form one preferred embodiment of the control system of the invention.

To achieve this improved functionality, a dc injection and even harmonics control system is provided for connection between a power source and a utility and/or ac loads. The control system generally is configured for receiving power output from the power source and converting it to a power form suited to the utility, i.e., ac current, or to the ac loads, i.e., ac voltage. As discussed above, it is important that the power output from control system have limited amounts of dc current and even harmonic current with acceptably small amplitudes. In this regard, the control system includes a power converter that provides the function of converting the power to an acceptable form with a desired shape (e.g., substantially sinusoidal). Significantly, a reference device is included in the control system to provide a reference signal with a dc offset to the power converter to control the operation of the power converter and achieve the desired shape of the output or converted power, i.e., the power output is maintained within the limits for dc current injection and even harmonic current injection. Of course, the reference device may be an integral part of the power converter, e.g., a software routine within a power converter microprocessor, or be a separate or add-on device adapted for use with a particular power converter.

In several preferred embodiments of the invention, a voltage transformer is included in the control system to substantially block dc current from flowing out of the power converter or into the utility. While providing effective dc injection control, the voltage transformer does not limit even harmonic current flow.

To address the problem of even harmonic current injection, the control system in several preferred embodiments includes a feedback control loop that functions to calibrate or select the dc offset portion of the reference signal to tightly control the amount of dc current output by the power converter to effectively control even harmonic current injection into the utility. The feedback control loop generally functions by sensing) current flowing into and out of the voltage transformer, determining the magnitude of the second harmonic current of the measured current, and then computing the dc offset portion of the reference signal that will achieve a desired shape of the output of the power converter. To sense the current, current transformers can be utilized and placed on the inlet to the voltage transformer (for standalone operating mode to sense even harmonic current injection from the power converter), the outlet of the voltage transformer (for grid-tied operating mode to sense even harmonic Current injection into the voltage transformer from the utility side), or on both sides (to account for both operating modes or for better accuracy). In a preferred embodiment, current transformers are placed on the inlet and the outlet of the voltage transformer and an outlet signal combiner is utilized to combine the outputs of the two current transformers to provide a signal that corresponds to the load current of the voltage transformer (i.e., does not include load current passing through to the utility or load) to provide improved calibration accuracy.

According to another feature of the invention, a harmonic analyzer is included in the feedback loop to process the signal from the signal combiner to compute the magnitude and phase of the second harmonic current in the voltage transformer load current. The harmonic analyzer may also be used to determine the total harmonic distortion (THD) of this load current. The harmonic analyzer then can be operated to display this and other information (such as other individual or combinations of individual harmonics of the voltage transformer load current) and/or to transmit the information to a controller of the feedback control loop.

The controller is included to take the output information of the harmonic analyzer and to initially determine and/or to adjust the previously determined dc offset. The controller may be configured or adapted to determine the dc offset to be included in the reference signal to operate the power converter to achieve a number of goals. For example, the dc offset may be selected or determined by the controller to zero out or nearly zero out the linearized second harmonic magnitude to provide control over even harmonic current injection into the utility. Alternatively, the dc offset is selected by the controller to minimize the THD. In another application or operation of the control system, it may be desirable to select the dc offset so as to minimize the magnitude of the second harmonic current entering the voltage transformer from the power converter side. Each of these methods serves to zero out or at least reduce the dc current injection entering the voltage transformer and hence, to minimize even harmonics. Once a dc offset is computed and/or selected the controller transmits this information in a control signal to a reference device or alternatively, directly to the power converter as a reference signal with a dc offset.

Clearly, the feedback control loop of the present invention provides significant improvement in the control of the output of power converters. This control allows a user of the invention to meet and often exceed strict limits on dc injection and even harmonic current injection and to meet other power output objectives. Additionally, the feedback control loop provides the function of ongoing and nearly continuous calibration of the power converter. Although in some embodiments of the invention the power converter is only calibrated prior to installing the control system, several embodiments include a feedback control loop in the control system to provide at least periodic updating of the dc offset. This ongoing calibration overcomes accuracy problems in prior control systems caused by drift, temperature fluctuations (e.g., calibration at one temperature and use at a significantly different temperature), and other operational factors.

Other features and advantages of the invention will become clear from the following detailed description and drawings of particular embodiments of the dc injection and even harmonics control system of the present invention.

BRIEF DESCRIPTION OF THE DRAWINGS

The accompanying drawings, which are incorporated in and form a part of the specification, illustrate the preferred embodiments of the present invention, and together with the descriptions serve to explain the principles of the invention. In the Drawings.

DETAILED DESCRIPTION OF THE INVENTION

With the above brief summary of the invention understood it may be helpful in understanding the invention to discuss specific embodiments of dc injection and even harmonics control systems according to the invention in conjunction with functional block diagrams electronic schematics, and graphs. The included graphs are useful for illustrating how the control systems function to control dc current injection and the amplitude of even harmonics in power distribution systems. As will become clear from the following description, the control system is adapted for an extended service life with little or no drift over time or at varying( temperatures and reduced fabrication complexity and cost and to be adaptable for many applications with numerous embodiments that provide the essential function of enabling a user of the control system to readily and safely connect a distributed power source to ac loads and to a utility or utility grid (by meeting or exceeding IEEE standards).

Figure 1:
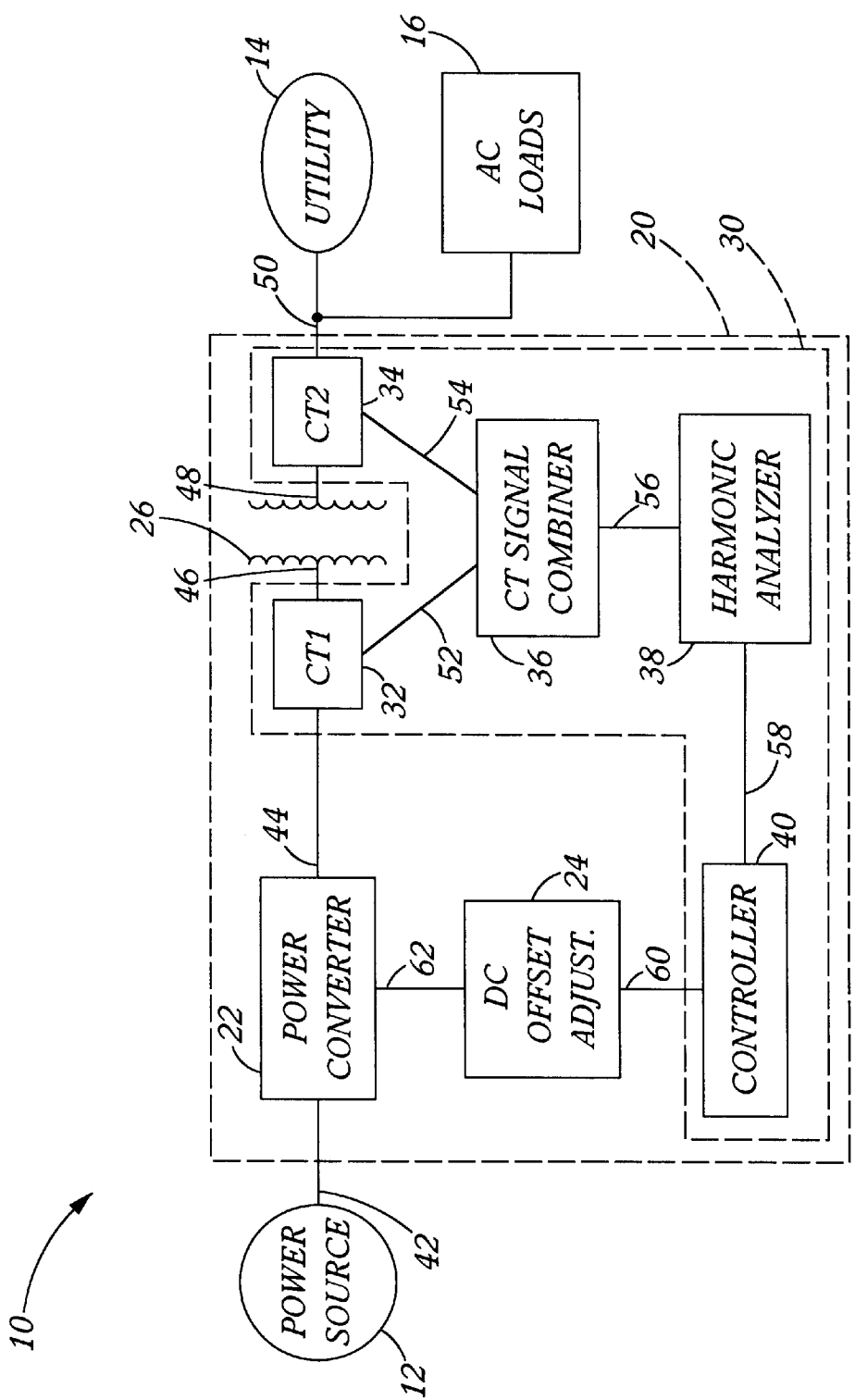
FIG. 1 is a functional block diagram of a power distribution system with a utility grid-tied and/or stand alone distributed power source with one embodiment of the dc injection and even harmonics control system of the invention positioned between the power source and the utility and ac loads.

Referring to FIG. 1, a power distribution system 10 in which the features of the invention can be effectively utilized is illustrated. The power distribution system 10 includes a power source 12, such as a distributed generator, with an outlet lead 42 that supplies power via lead 50 to a utility 14 in a grid-tied operating mode (e.g., utility interactive mode) and/or to ac loads 16 in a stand alone operating mode. In this regard, the power source 12 may be any source of power that is convertible to ac or dc electrical energy, such as batteries, fuel cells, photovoltaics (e.g., solar power sources), wind turbines, hydro turbines, and the like.

A dc injection and even harmonics control system 20 is positioned between the power source 12 and the utility 14 and ac loads 16 to provide control of the dc current magnitude and the amplitude of even harmonics output on lead 50. The control system 20 includes a power converter 22 that is configured to convert the power received on lead 42 from the power source 12 to a form suitable for interconnection with the utility 14 and/or for powering stand-alone ac loads 16. This converted power is transmitted from the power converter 22 on lead 44. The power converter 22 may be any of a number of known converters, such as an ac to ac converter or a dc to ac converter (i.e., an inverter) because many of the devices used for power source 12 have dc power outputs.

In one mode of operation, the power converter 22 is operated in parallel with the utility 14 and in this mode of operation it is generally operated as an ac current source. Typically, as may be clear to those skilled in the energy industry, it is typically required that the individual or company connecting a power source 12 regulate system ac voltage and frequency provided at lead 50, i.e., the connection to the utility 14. Significantly, according to the invention, the control system 20 provides this regulation of signals on lead 50 and, further, to meet requirements that the ac output current on lead 50 to the utility 14 be a relatively clean sinusoidal source signal with current total harmonic distortion (THD) less than 5 percent of rated output current of the power source 12. Additionally, as discussed above, the IEEE has enacted stricter standards (i.e., IEEE Standard 929) that require tighter limits on the magnitude of the even harmonics of the output current on lead 50 to utility 14, and as will become clear, the control system 20 includes features that make it readily possible to meet even these stricter standards for controlling the output of even harmonics from a power source 12.

Of course, when the control system 10 is operating in stand-alone mode, the power output from the control system 10 and, particularly, the power converter 22 is not transmitted to the utility 14 but is transmitted directly to ac loads 16. In this stand-alone mode of operating, the power converter 22 is operated (and controlled) as an ac voltage source. The features of the control system 20 function in combination to regulate the output voltage and frequency on lead 50 as applicable for ac loads 16. In this mode of operation, the control system 10 acts to prevent transformer saturation.

According to one significant feature of the invention, the control system 20 includes a reference device 24 with dc offset adjustment to provide a reference signal on lead 62 to the power converter 22 to control the shape of the output current on lead 44 and, thereby, lead 50 when the control system 20 is operated in the grid-tied mode (i.e., providing power to the utility 14). When the control system 20 is operated in stand-alone mode (i.e., providing power directly to ac loads 1 6), the reference device 24 provides a reference signal on lead 62 that controls the operation of the power converter 22 to control the shape of the output voltage from the power converter on lead 44 and, thereby, lead 50. The reference device 24 preferably is configured to be able to adjust the dc offset via the reference signal or by other means known to those skilled in the art to effectively adjust the dc current injection at the output of the power converter 22 on lead 44. The reference signal transmitted by the reference device 24 is explained in more detail in connection with FIGS. 8 and 9.

The control system 20 further includes a voltage transformer 26 with an input lead 46 and an output lead 48 to provide connection between the power source 12 and the utility 14 via lead 50. The voltage transformer 26 is included in the control system 20 to block dc current from being output on lead 50 and entering the utility 14. Tile voltage transformer 26 also isolates the power source 12 from the utility 14 which is often required by energy distribution standards (e., in the United States, isolation is required in certain distributed generator applications by the National Electrical Code regulations). The voltage transformer 26 is preferably included in the control system 20 for many applications or uses of the control system 20 in which the ac voltage output of the power converter 22 might differ from the ac voltage of the utility 14 (but the voltage transformer 26 is not limited to isolating transformers). In this regard, the voltage transformer 26 can be any typical voltage transformer configured to convert an input ac voltage to another output ac voltage. Preferably, the voltage transformer 26 is designed to operate at 50. 60 or 440 Hertz, with 60 Hertz being preferred for most applications in the United States, however, other operating frequencies can readily be used to practice the invention. The voltage transformer 26 can have multiple primary and secondary windings, and in residential applications for the power source 12 and control system 20, the voltage transformer 26 can have a 120/240-volt center tap output winding for connection to the utility 14 or ac loads 16.

Significantly, any dc current which is injected into the voltage transformer 26 whether from the power converter 22 on input lead 46 or from the utility 14 or ac loads 16 on output lead 48 causes the voltage transformer 26 to attempt to draw even harmonic currents from the voltage source connected to the voltage transformer 26. More specifically, without the use of the features of the control system 20, even harmonic currents would enter the voltage transformer 26 from the utility 14 side via leads 50 and 48 in the grid-tied operating mode and from the power converter 22 side via leads 44 and 46 in the stand-alone operating mode. The utility 14 can be thought of as an aggregation of power generators, transmission, and distribution equipment, and the point of connection from the power source 12/control system 20 combination to the utility 14 is typically the main breaker box in a residence or commercial facility. The utility 14 is not necessarily a large electric utility company but may be a simple, small motor generator set. Common characteristics for all types of utilities 14 include a low impedance connection to an ac voltage source that regulates ac voltage and frequency to some fixed standard and a single phase or multiphase connection. For example, a residential utility connection is often a single phase 3 wire, 120/240 volt. 60 Hertz connection. In the grid-tied operating mode, the ac loads 16 may be loads connected to the utility 14 side of the point of connection (i.e., generally, a point on lead 50) or may be loads on the customer side of the utility connection. In the stand-alone operating mode, the utility 14 is disconnected at the point of connection, and the ac loads 16 are powered directly from the power source 12 and the power converter 22 of the control system 20.

According to an important feature of the invention, the control system 20 in the embodiment illustrated in FIG. 1 is configured to control operation of the power converter 22 based on current entering the voltage transformer 26 on leads 46 and 48 to minimize dc current injection and, consequently, to minimize the tendency of the voltage transformer 26 to draw even harmonic currents. In this regard, the control system 20 includes a feedback control loop 30 to calibrate and operate the power converter 22 to account for any changes that may occur within the system 20 due to drift, temperature changes, and other factors. The control system 20 has a first current transformer 32 on the power converter 22 side of the voltage transformer 26 and a second current transformer 34 on the utility 14 side of the voltage transformer 26. These two current transformers 32, 34 function in combination to insure that the control system 20 accurately measures even harmonic currents entering the voltage transformer 26 during any operating mode. The first current transformer 32 is located between the power converter 22 and voltage transformer 26 and functions to measure current between these devices on lead 44 and in response, to transmit an output signal on lead 52. The second current transformer 34 is located between the voltage transformer 26 and the utility 14, and it functions to measure current between the voltage transformer 26 and the utility 14 (i.e., on leads 48 and 50) and to transmit an output signal on lead 54. While myriad current sensors can be utilized in the control system 20 such as hall effect current sensors, steel core ac current sensors are used for current transformers 32 and 34 in a preferred embodiment. The current transformers 32 and 34 preferably are rated for the full output current of the power converter 22 and of the utility 14, respectively.

To further the current sensing and control functions of the control system 20, the feedback control loop 30 further includes a CT signal combiner 36 to receive the output signals of the first and second current transformers 32, 34 on leads 52, 54, respectively. The CT signal combiner 36 is included to combine these output signals and is configured such that load current flowing from the power converter 22 on lead 44 to the utility 14 and/or ac loads 16 through the voltage transformer 26 is removed or filtered from the output signals. The CT signal combiner 36 then outputs a combined signal that only represents the load current of the voltage transformer 26. The overall effectiveness of the control system 20 is improved by combining the output signals of the current transformers 32, 34 in this way because the signal to noise ratio for measurement of even harmonic amplitudes is significantly enhanced.

The feedback loop 30 includes a harmonic analyzer 38 that receives the combined signal from the CT signal combiner 36 on lead 56. The harmonic analyzer 38 is provided to process the combined signal to determine the magnitude and phase of the second harmonic current in the current passing through the voltage transformer 26. To operate effectively, the harmonic analyzer 38 requires a reference signal that provides it with a measure of the fundamental system frequency and phase angle. For example, but not as a limitation, the harmonic analyzer 38 may comprise a Fluke 41B Power Harmonic Analyzer or newer model, available from Fluke Corporation, Everett, Washington United States of America. The reference signal for this exemplary analyzer is the output ac voltage bus. Other types of harmonic analyzers could readily use other reference signals in the system, such as the power converter 22 output voltage or the reference signal with a dc offset from the reference device 24. In a preferred embodiment of the invention, the harmonic analyzer 38 includes a display screen (not shown) to display the determined magnitude and phase angle of the second harmonic current for reading by a user/operator, and may additionally display the current THD and/or other individual or combinations of individual harmonics of transformer current. The harmonic analyzer 38 transmits an output signal on lead 58 for further processing and use in controlling the power converter 22.

A controller 40 is included in the feedback control loop 30 to provide a number of functions. In a production line environment (e.g., a factory calibration setting for a power converter 22), the controller 40 may be a person who performs the following described functions. If the controller 40 is integrated into a distributed generator (such as power source 12) product, the controller 40 typically comprises a software routine located in the generator's control microprocessor but, of course, may readily be a separate microprocessor with appropriate hardware and software components. The use of microprocessors and the like is preferable in applications where the calibration of the power converter 22 is done on an ongoing and nearly continuous basis to effectively maintain the output of the control system 20 within acceptable limits.

Figure 12:
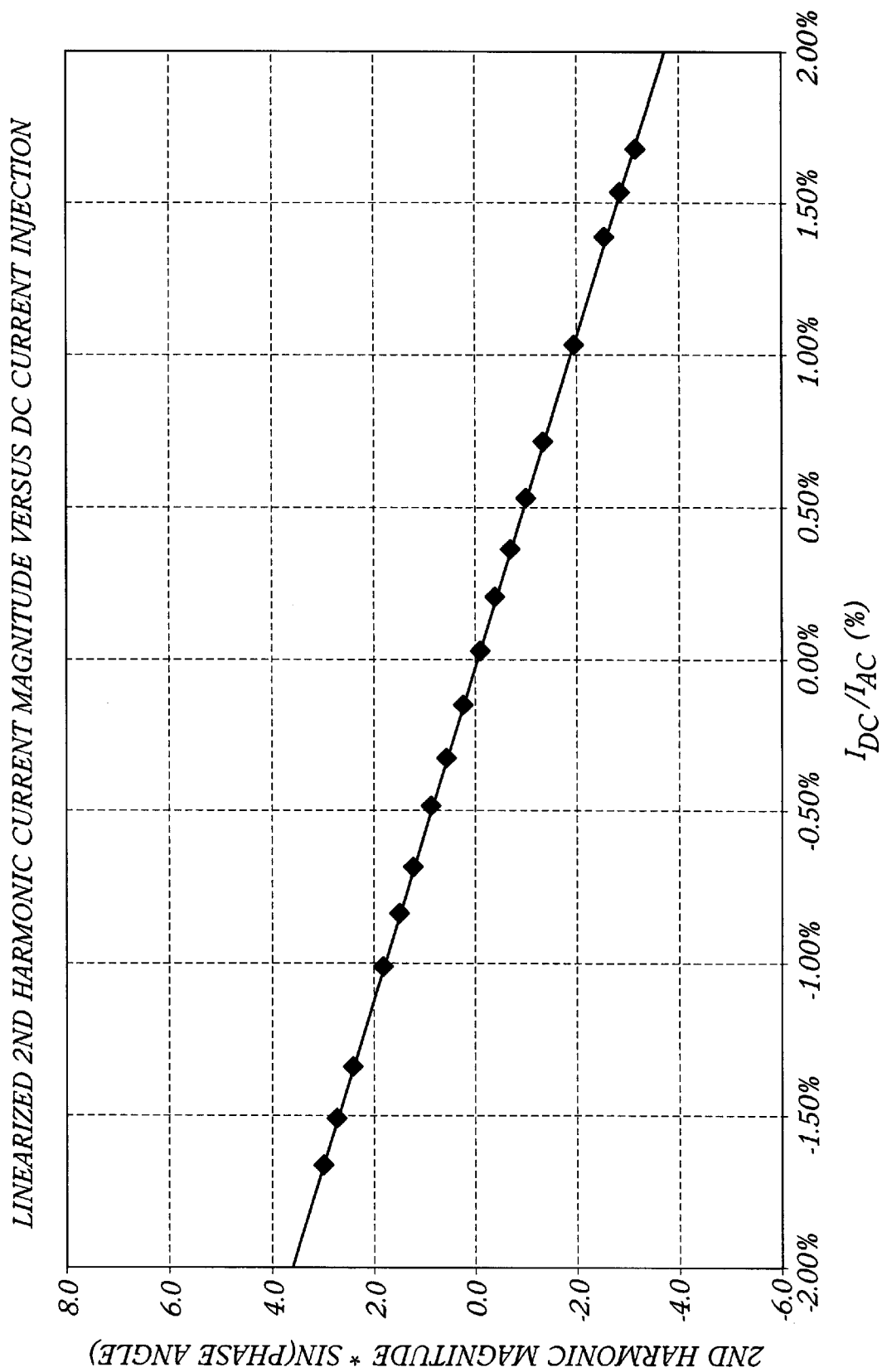
FIG. 12 is graph illustrating the linearization of the complex magnitude and phase angle of the second harmonic as a function of dc current injection according to the present invention to facilitate dc current injection control.

The controller 40 receives the output signal from the harmonic analyzer 38 and processes the output signal. The controller 40 then transmits a control signal on lead 60 to operate the reference device 24 to adjust the dc offset in the reference signal on lead 62. In this manner, the power converter 22 is controlled to zero out or substantially zero out the linearized second harmonic magnitude as illustrated in FIG. 12. Additionally or alternately, the controller 40 may be designed to transmit a control signal that operates the reference device 24 to adjust the dc offset to minimize the magnitude of the current THD. Further, the controller 40 in some preferred embodiments controls the reference device 24 to adjust the dc offset in the reference signal to operate the power converter 22 to minimize the magnitude of the second harmonic current into the voltage transformer 26. These controller 40 actions serve to zero out the dc current injection entering the voltage transformer 26, which beneficially controls even harmonics and facilitates the power converter 22 in meeting set limits on dc current and even harmonics injection to the utility 14.

While the above discussion of the control system 20 of FIG. 1 describes one preferred embodiment of the invention, it should be understood that the invention includes a number of unique features that provide advantageous control over dc current injection and control over even harmonics that may be incorporated in other control system embodiments. A number of such embodiments are illustrated in FIGS. 2–5 which will be briefly discussed in the following paragraphs. Of course, other embodiments will be apparent to those in the power distribution industry and are generally considered to be within the breadth and coverage of the present invention.

Figure 2:
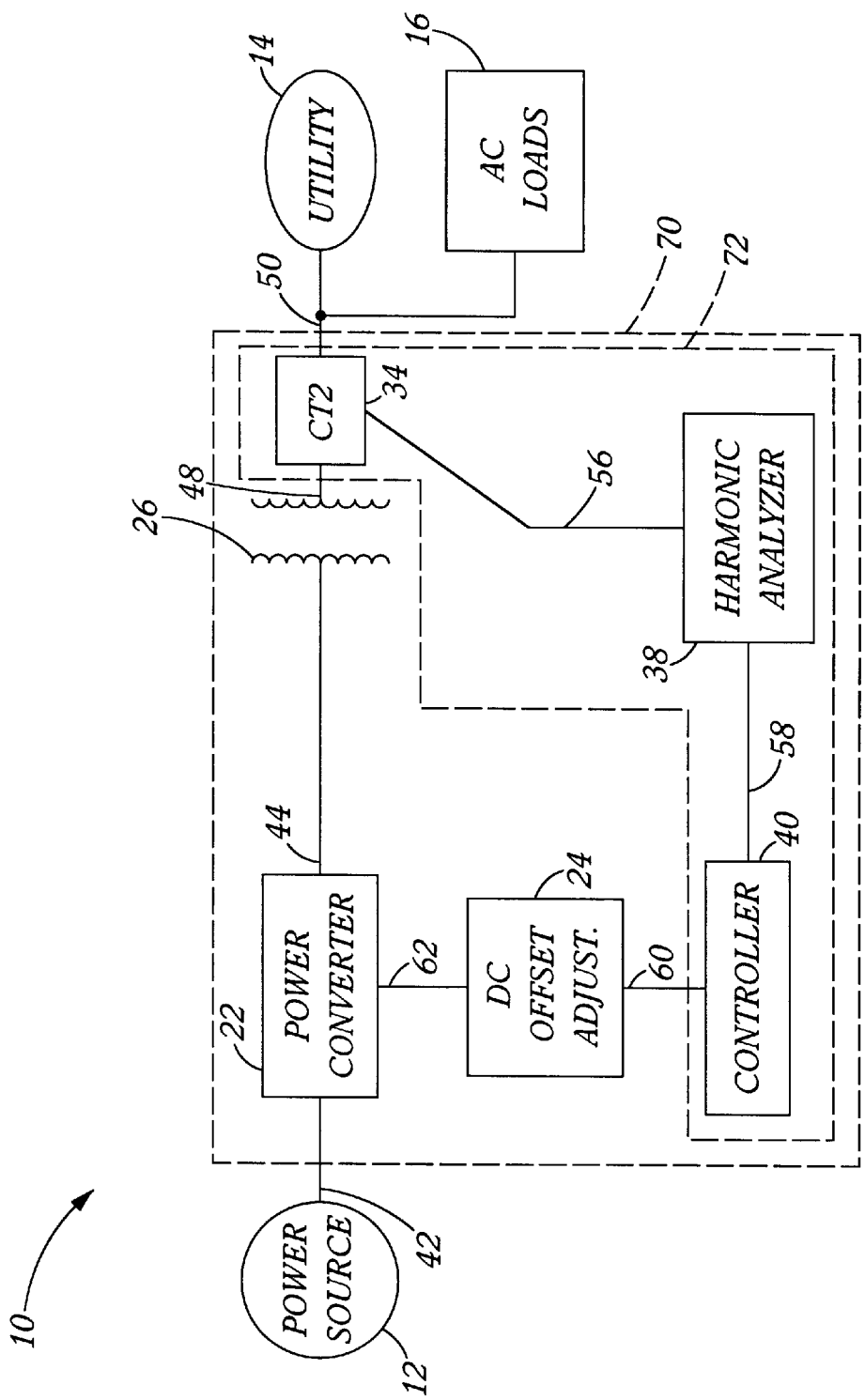
FIG. 2 is a functional block diagram of a power distribution system similar to FIG. 1 with an alternate embodiment of the control system useful in utility grid-tied applications.

Referring to FIG. 2, an alternate control system 70 with a feedback control loop 72 is illustrated that is useful for connection of a power source 12 to a utility 14 grid, i.e., for a grid-tied interactive operating mode. The ac loads 16 in this case would be connected downstream from the utility connection (as discussed in detail above) on lead 50. When the control system 70 will only operate with this type of utility 14 connection, the feedback control loop 72 can be simplified relative to the feedback control loop 30 illustrated in FIG. 1 to reduce cost and complexity while still providing the improved control functions of the invention. This simplification includes the removal of the first current transformer 32 and the CT signal combiner 36 as shown in FIG. 1. The other functions of the control system 30 of FIG. 1 are included and are similar for the feedback control loop 72 and alternate control system 70.

Figure 3:
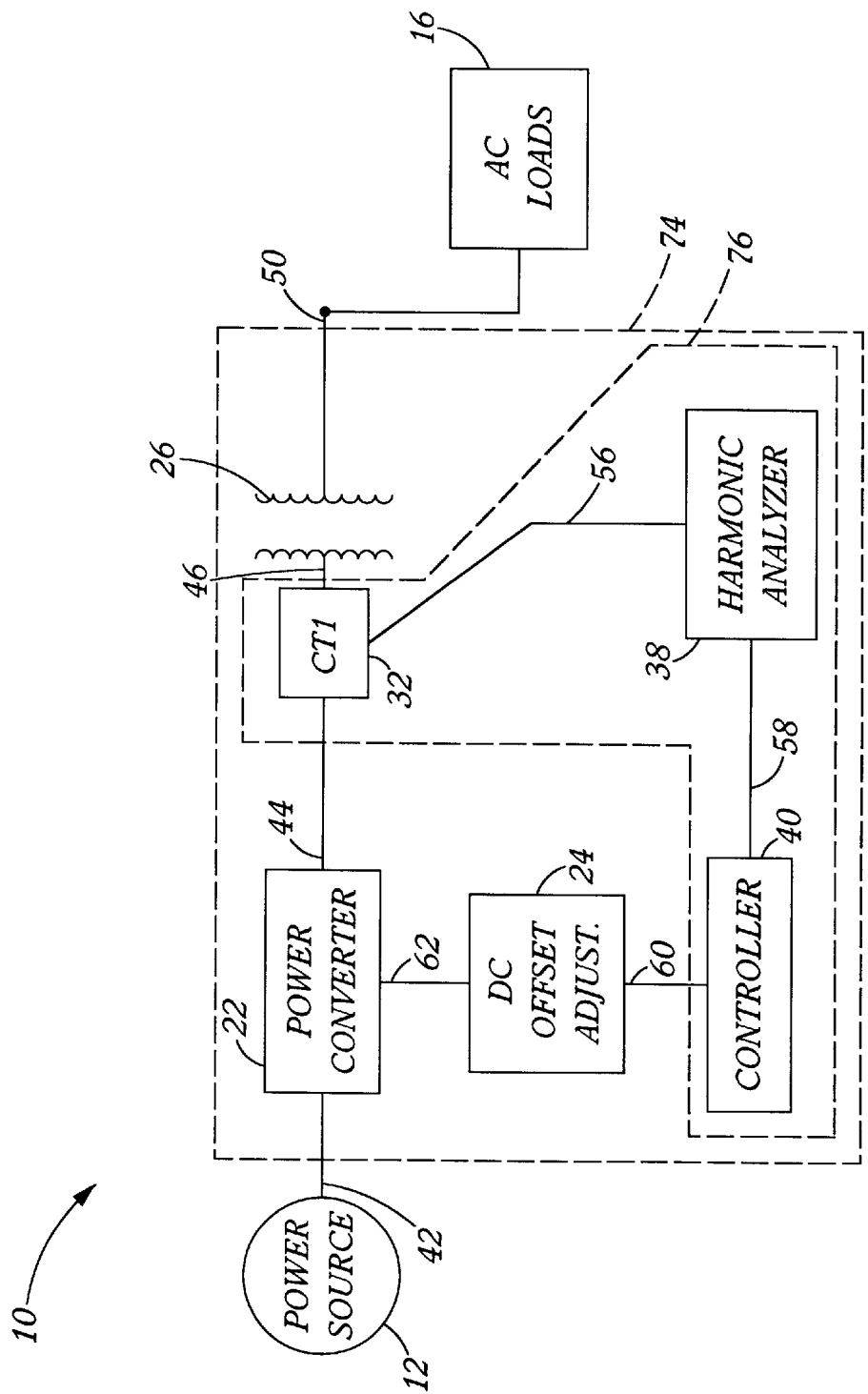
FIG. 3 is a functional block diagram of a power distribution system similar to FIG. 1 with another embodiment of the control system useful in stand-alone distributed power source applications.

Referring to FIG. 3 an alternate control system 74 with a feedback control loop 76 is illustrated that is useful for stand-alone operations with ac loads 16 (i.e., when the power source 12 and control system 74 will not be connected to utility 14). In the stand-alone operating mode, the feedback control loop 76 can be altered from the loop 30 illustrated in FIG. 1 by the removal of the second current transformer 34 and the CT signal combiner 36.

Figure 4:
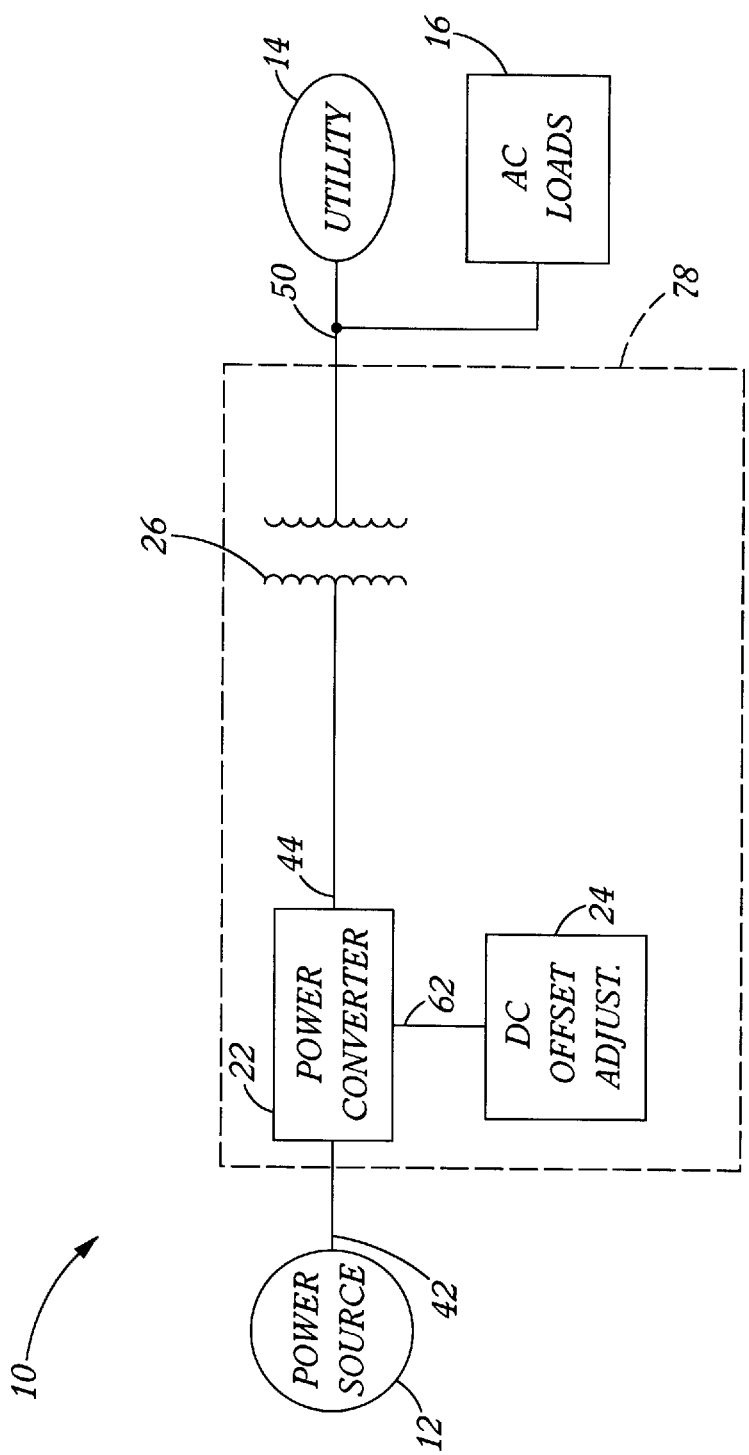
FIG. 4 is a functional block diagram of a power distribution system similar to FIG. 1 with an embodiment of the control system that includes a pre-installation or factory calibrated power converter that does not include a feedback control loop.

Now, turning to FIG. 4, another alternate control system 78 is shown according to the present invention in which no feedback control loop is utilized. In this embodiment of the invention, the control system 78 is calibrated prior to installation in the power distribution system 10, such as may be the case if the control system 78 is calibrated in the factory upon initial fabrication. The power converter 22 via the reference device 24 may be adjusted periodically or as required because of drift or other inaccuracies that may develop over time in the field simply by bringing the portions of the feedback control loops 30, 72, or 76

(depending on which operating mode the control system 78 is being utilized). In this manner, these feedback control loops 30, 72, and 76 can be thought of as field calibration tools.

Figure 5:
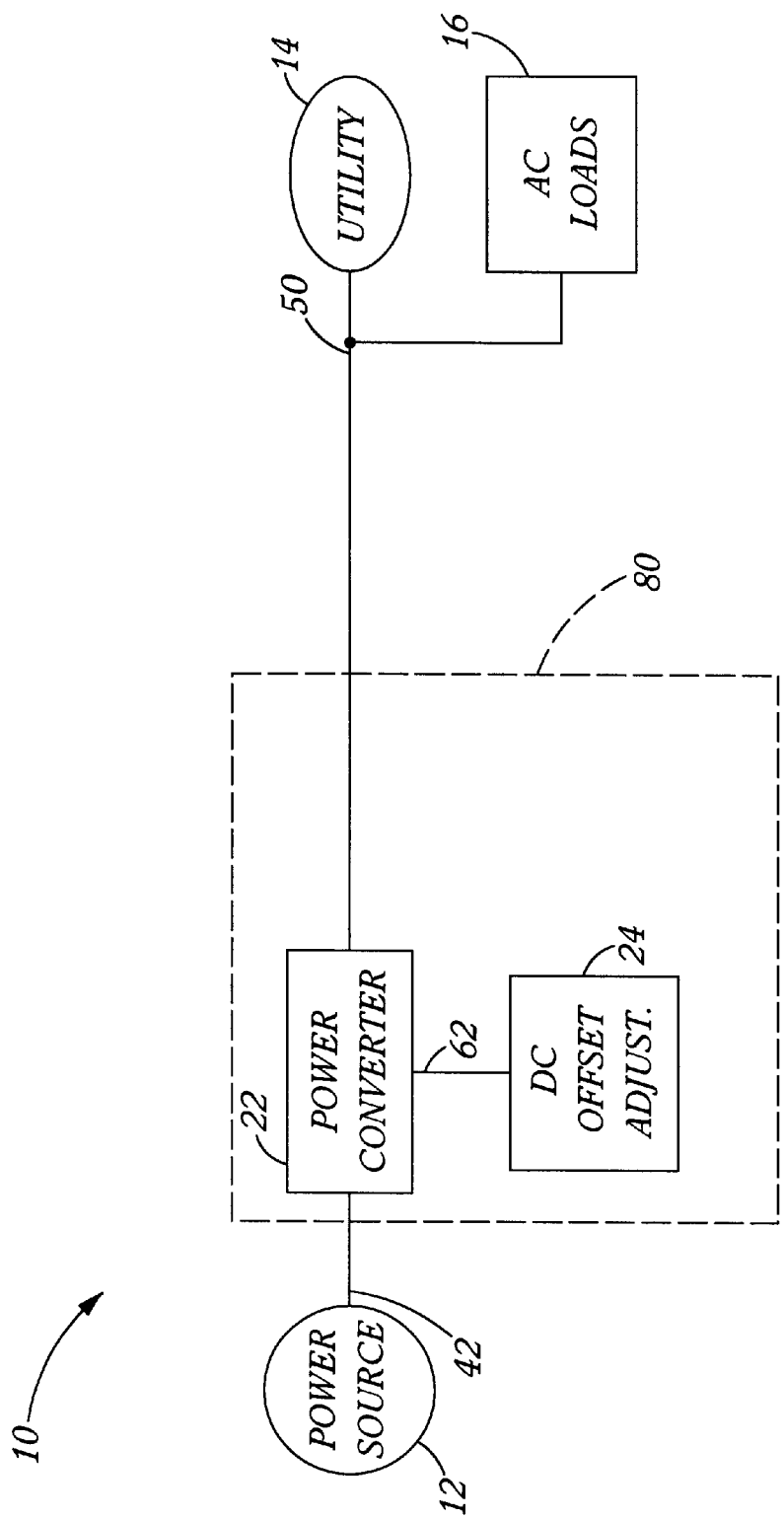
FIG. 5 is a functional block diagram of a power distribution system similar to FIG. 1 with a control system similar to that of FIG. 4 but without a voltage transformer.

FIG. 5 illustrates a control system 80 that is similar to the control system 78 of FIG. 4 except that the control system 80 does not include the voltage transformer 26. This is a useful embodiment of the invention because not all distributed generator systems 10 include voltage transformers. At this point, it should be noted that the control systems 70 and 74 of FIGS. 2 and 3, respectively could readily be used without the voltage transformer 26 to provide a feedback control loop in a system such as that shown in FIG. 5. The control system 80 of FIG. 5 is another example of a control system 80 which is useful for factory or pre-installation calibration, and field calibration can be completed with the use of the components of a feedback control loop such as loops 72 and 76 shown in FIGS. 2 and 3, respectively. As with the other control systems, the control system 80 is useful for assuring that the power converter 22 does not inject more than 0.5 percent dc current into the utility 14. Typical utility grids include a number of voltage transformers throughout their grid or network. Consequently, it is important that the power converter 22 with the reference device 24 with dc offset adjustment is calibrated according to the unique techniques of the invention (e.g., through the use of one of the described feedback control loops) to prevent damage to the grid voltage transformers from dc current and/or even harmonics injection.

Figure 6:
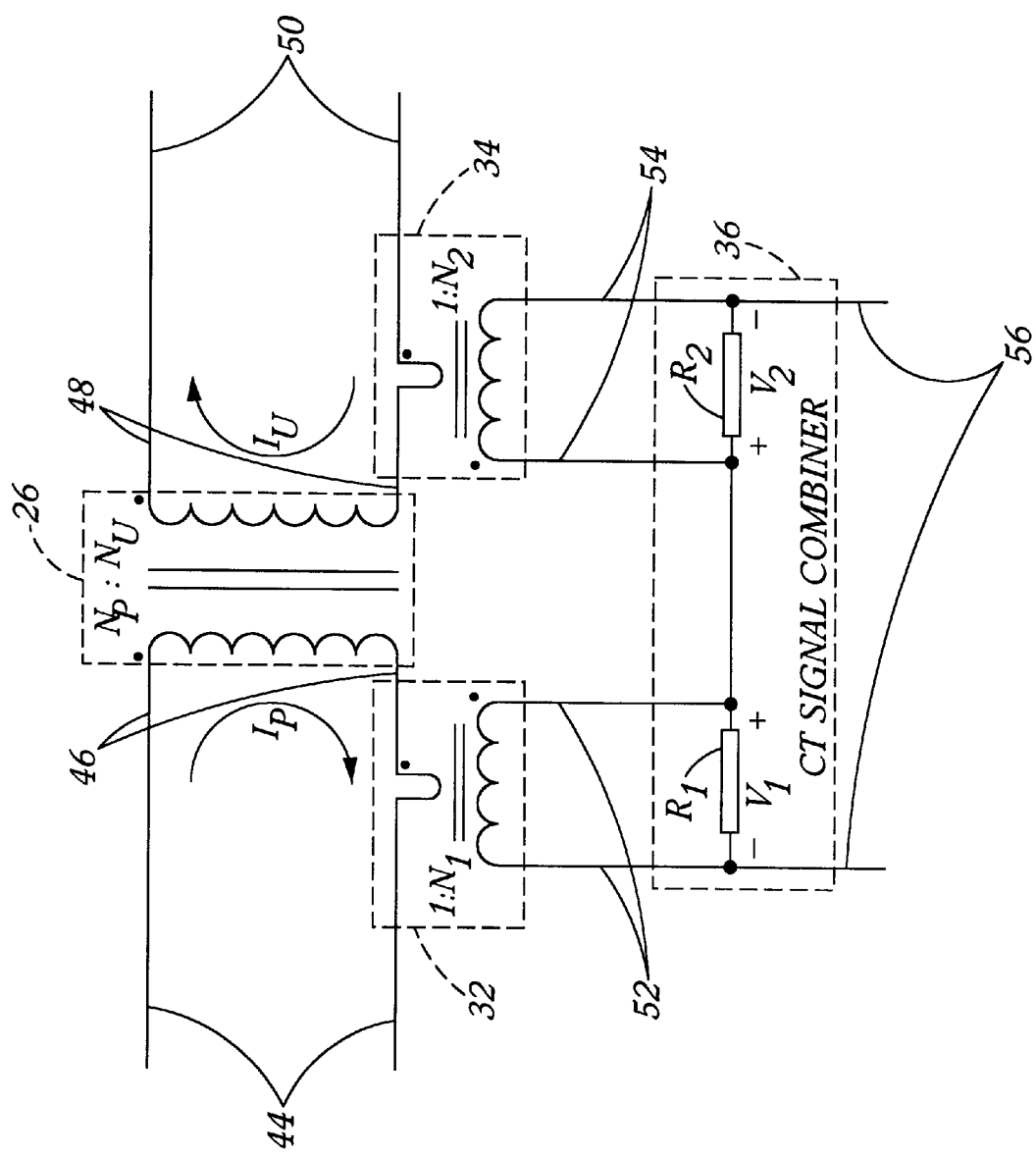
FIG. 6 is an electrical schematic of the connection of the voltage transformer, the inlet and outlet current transformers, and the current transformer signal combiner of FIG. 1.

To further describe the operation and preferred configuration of the control system 20 of FIG. 1, an electrical schematic showing more clearly the connections and current flow near the voltage transformer 26 is illustrated in FIG. 6. Specifically, FIG. 6 illustrates the interconnections of the voltage transformer 26, the first and second current transformers 32 and 34, respectively, and the C r signal combiner 36. The winding turns ratio of the voltage transformer 26 is $N_p:N_u$ where $N_p$ is the number of turns on the power source 12 side and $N_u$ is the number of turns on the utility 14 side of the voltage transformer 26. The utility 14 and ac loads 16 current on lead 50 is represented as $I_u$ and the current coming out of the power converter on lead 44 is represented by $I_p$. The relationship between $I_p$ and $I_u$ is determined by the formula:

$$I_p*N_p=I_u*N_u$$

Turning back to FIG. 6, the first and second current transformers 32 and 34 are shown as having only a single primary winding. While this is a preferred embodiment, these current transformers 32, 34 may have multiple primary windings. The output signal or output current of the first current transformer 32 can be determined from the formula:

$$I_{CT1}=I_p/N_1$$

where $N_1$ is the number of windings of the first current transformer 32. Similarly, the output signal or output current of the second current transformer 34 can be determined from the formula:

$$I_{CT2}=I_u/N_2$$

where $N_2$ is the number of windings of the second current transformer 34.

Within the CT signal combiner 36, the voltage across resistor, $R_1$, is:

$$V_1=I_{CT1}*R_1$$

The voltage across resistor $R_2$, is:

$$V_2=I_{CT2}*R_2$$

Consequently the combined signal or output of the CT signal combiner 36 can be determined by:

$$V_3=V_1-V_2$$

Preferably, $N_1$, $N_2$, $R_1$, and $R_2$ are chosen such that voltage, $V_3$, would be zero if the voltage transformer 26 were an ideal transformer. In other words, $N_1$, $N_2$, $R_1$, and $R_2$ are preferably selected to satisfy the following formula:

$$N_u*R_1/N_1=N_p*R_2/N_2$$

The remaining signal $V_3$, i.e., output of the CT signal combiner 36, is representative of the real and reactive load consumed by the voltage transformer 26 itself and does not greatly depend on power flow from the power source 12 to the utility 14 or ac loads 16.

Significant to the operation of the invention, this combined signal of the CT signal combiner 36 includes even harmonics if there is dc current injection into the voltage transformer 26. If the ac loads 16 or the utility 14 have a tendency to draw even harmonics from the power converter 22, the above discussed method of selecting and configuring the components of the control system 20 and the feedback control loop 30 is effective in eliminating such even harmonics from interfering with the control of the power converter 22 to minimize dc current injection. In this regard, some loads, such as resistive loads, do not draw even harmonics but many loads, such as nonlinear loads which may draw current in pulses rather than smooth sinusoids, do tend to draw even harmonics which the control system 20 effectively accounts for in its configuration and operation.

Figure 7:
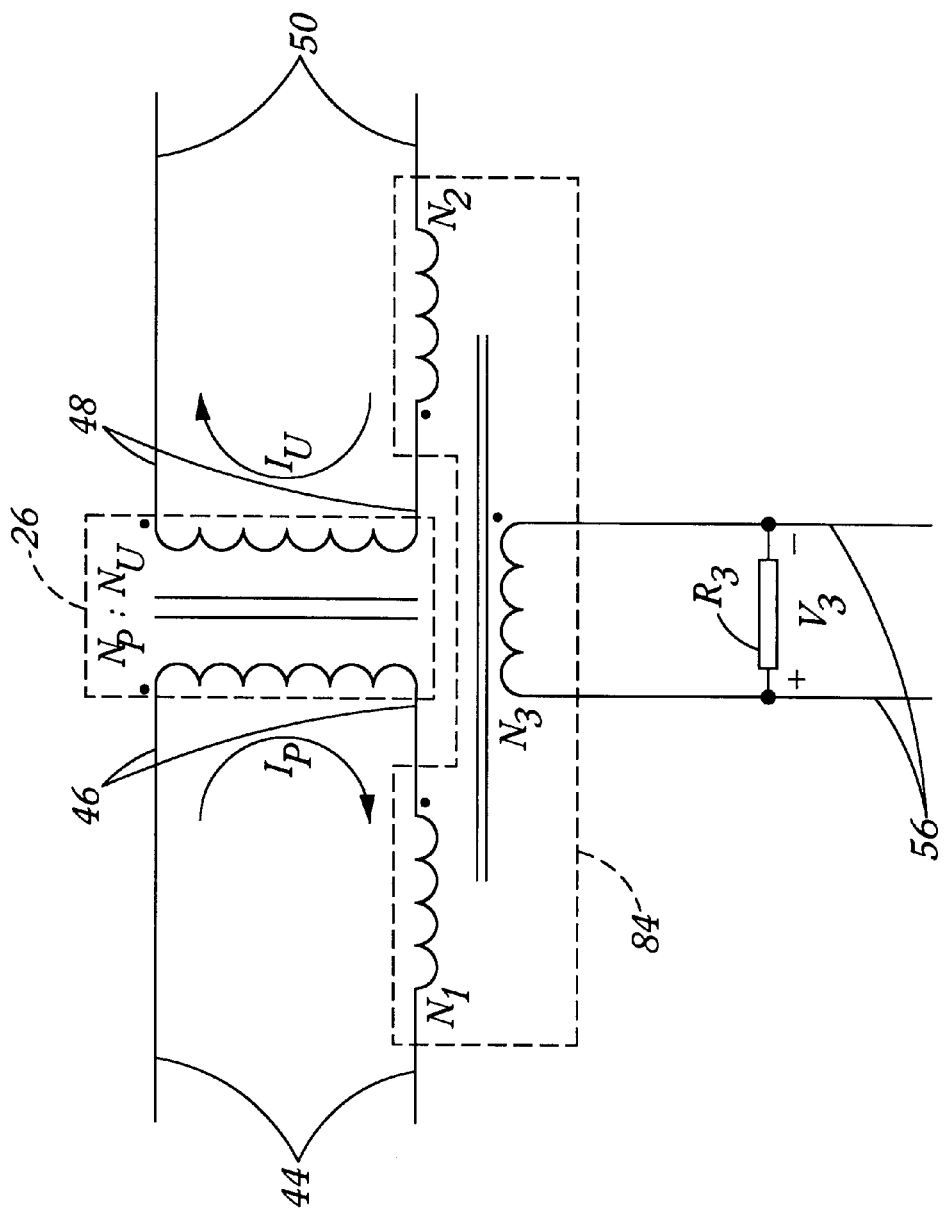
FIG. 7 is an electrical schematic similar to FIG. 6 illustrating an alternate embodiment in which the inlet and outlet current transformers and the current transformer signal combiner are integrated into a single device (e.g., a single current transformer).

Referring now to FIG. 7, an alternate configuration of the interconnection of the first and second current transformers 39, 34, the voltage transformers 26, and the CT signal combiner 36 is illustrated as a single current transformer 84. The current transformer 84 provides the advantage that it does not have to be rated for the full current rating of the power converter 22 or the utility 14. The primary windings, $N_1$ and $N_2$ of current transformer 84 must be rated to handle their respective currents, but the magnetic core and winding $N_3$ can be much smaller than that of current transformers 32 and 34. The function of combining output signals is done magnetically rather than by addition of voltages $V_1$ and $V_2$ as discussed in connection with FIG. 6. This combined or integrated current transformer 84 may also provide more accurate outputs and/or measurements of current because changes, with age and temperature variations, in the values of $R_1$ and $R_2$ could lead to some decrease in accuracy of the configuration shown in FIG. 6. As with the embodiment of FIG. 6, the remaining or combined signal $V_3$ is representative of the real and reactive load consumed by the voltage transformer 26 and includes even harmonics when dc current injection occurs at the voltage transformer 26. Of course, the configuration shown in FIG. 6 may be preferable over the configuration shown in FIG. 7 in applications in which it is desirable to sample the current signals $V_1$ and $V_2$ separated from $V_3$.

FIGS. 8–12 are now provided to further describe and discuss the use of the control signals from a controller (such as controller 40 shown in FIGS. 1–3) or pre-installation calibration to operate the reference device 24 to adjust dc off,set in the reference signal and/or otherwise affect the operation of the power converter 22 to control dc current and even harmonics output from the power converter 22.

Figure 8:
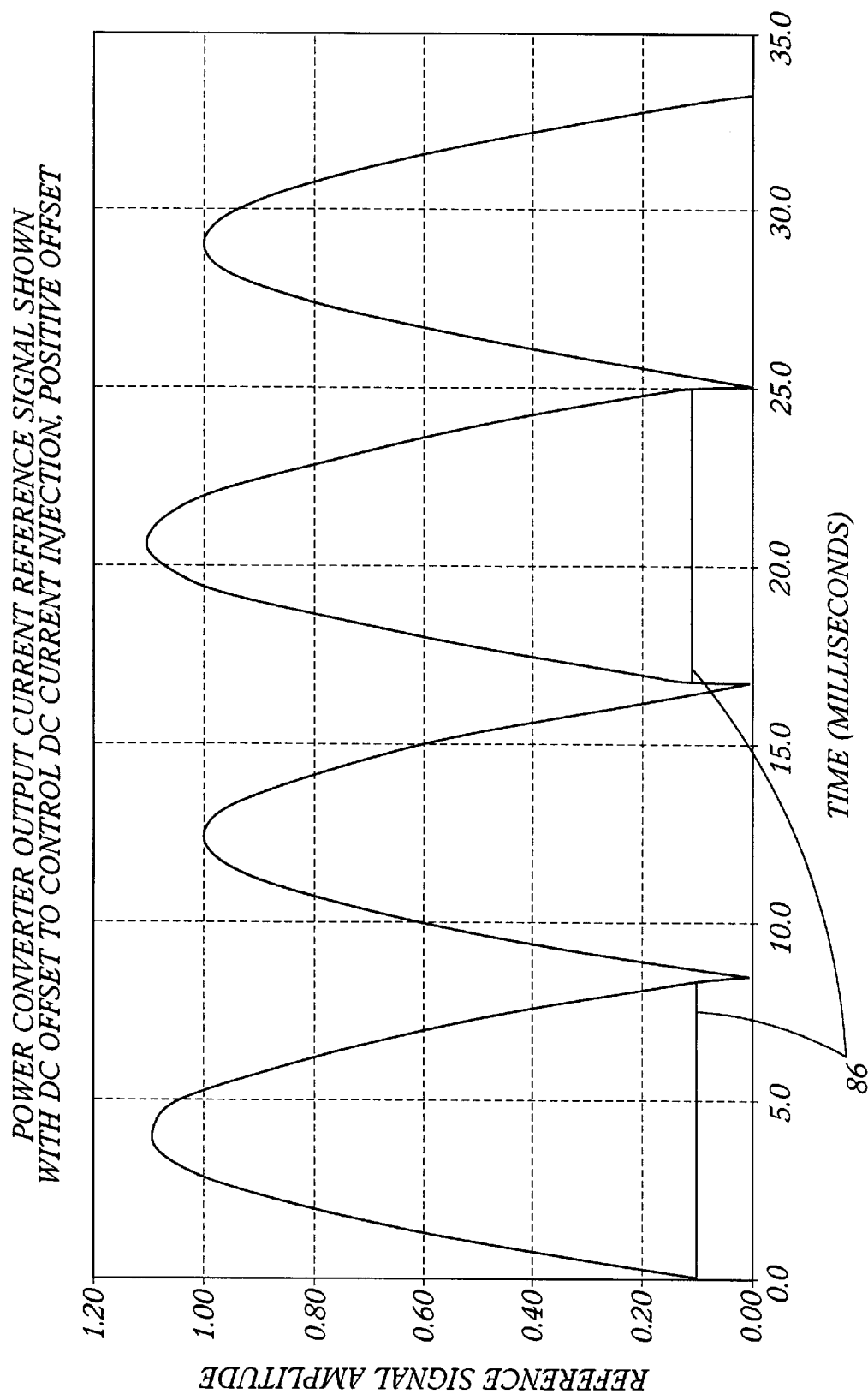
FIG. 8 is a graphical illustration of a positive dc offset being added to a power converter reference signal to effectively control dc current injection according to the invention and, particularly, using the embodiments of the control system shown in FIGS. 1–7.

FIG. 8 illustrates how the reference signal transmitted from the reference device 24 to the power converter 22 can be configured to include a positive dc offset adjustment 86. As illustrated, the reference signal is a rectified sine wave, and the positive dc offset 86 is added during the first half cycle of each full cycle of the reference signal sine wave. In this exemplary illustration of a reference signal, the dc offset adjustment 86 has a value (i.e., amplitude) of 0.1, and the peak of the normal reference signal has an amplitude of 1.0. In the utility grid-tied operating mode, the reference signal is used to control the output current of the power converter 22 to maintain a sine wave current output, and the magnitude of the positive dc offset adjustment 86 is selected to achieve such a desired current output from the power converter 22. Similarly, in the stand-alone operating mode, the reference signal is used to control the output voltage of the power converter 22 (by adjusting the value or amplitude of the positive dc offset adjustment 86) to maintain a sine wave voltage output from the power converter 22, whose skilled in the use of ac output power converters will understand that it is common practice to use rectified signals, such as those shown in FIG. 8, to the control of power converters 22 and will further understand how to apply and "unwrap" the reference signal to obtain a full sinusoidal waveform.

Figure 9:
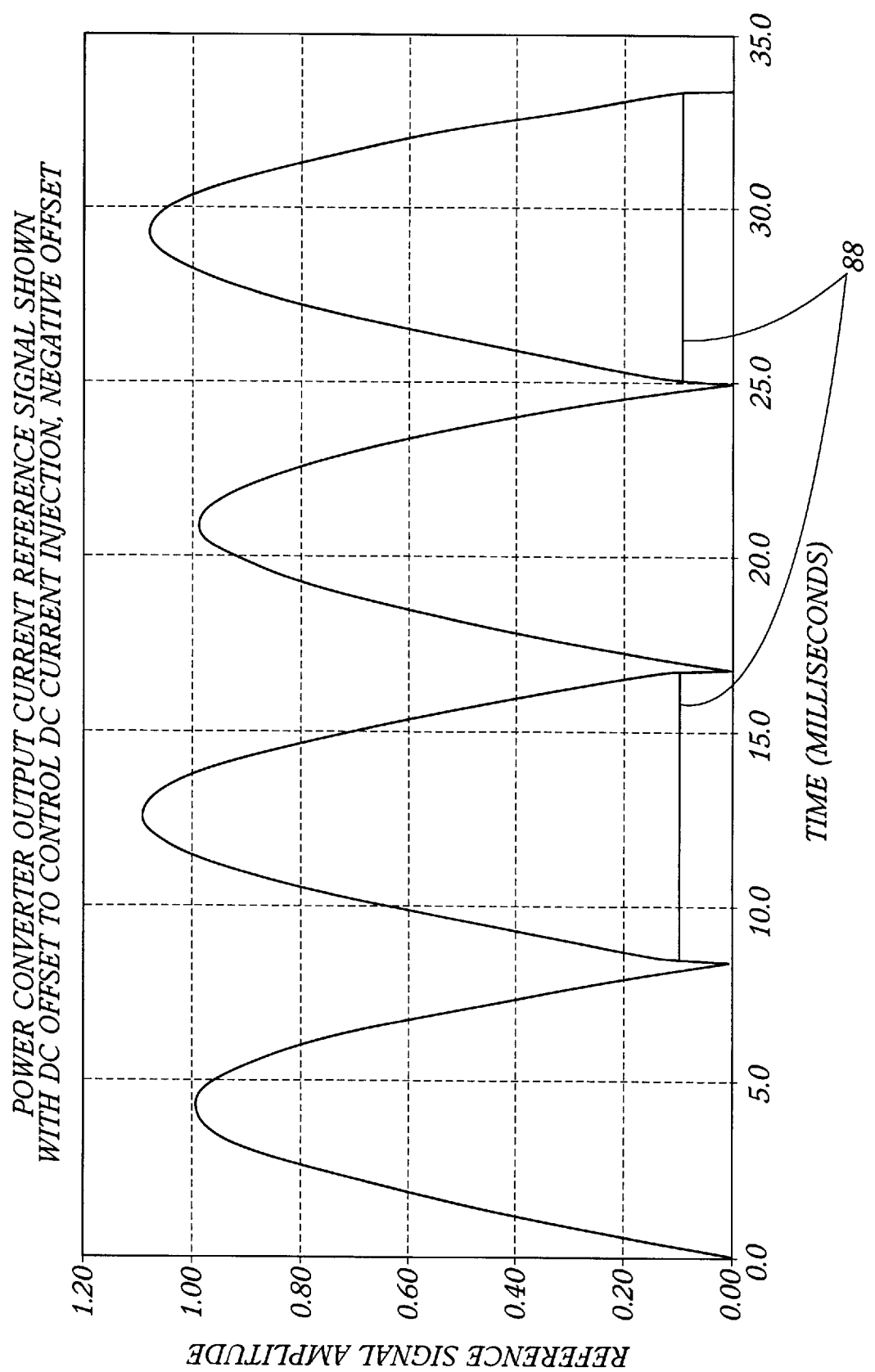
FIG. 9 is a graphical illustration of a negative dc offset being added to a power converter reference signal to control dc current injection according to the invention.

FIG. 9 illustrates a reference signal from the reference device 24 including a negative de offset adjustment 88. This method of controlling the power converter 22 may be useful in some operating modes and with some power converter 22 configurations for obtaining and maintaining sine wave voltage and current outputs, as discussed above. In this example of a reference signal the negative dc offset adjustment 88 is added to the reference signal during the last half cycle of each full cycle of the reference signal.

Figure 10:
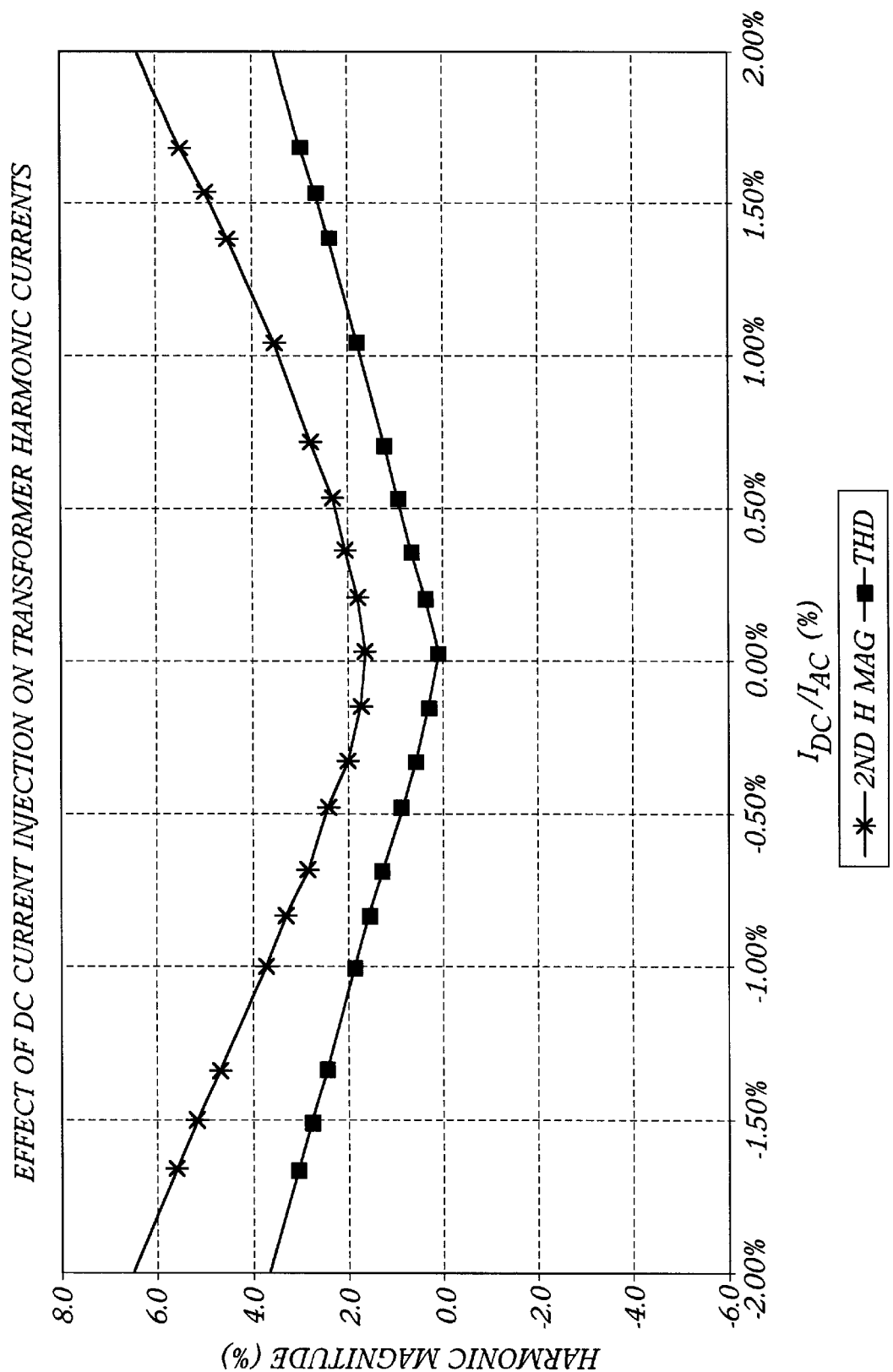
FIG. 10 is a Graphical representation of results of an experiment in which current harmonics were measured in a voltage transformer as a function of dc current injection into the voltage transformer.

FIG. 10 illustrates the results of an experiment completed by the inventor that graphically demonstrates the effects of dc current injection. The experiment was completed by measuring harmonic current and particularly, second harmonic current magnitudes in current flowing in a voltage transformer connected to a resistive load. The voltage transformer was a 325 VA rated toroid with a 24-volt secondary and a 120-volt primary and 97 percent efficiency. During the experiment, the transformer was operated at 71 percent of its rating and the connected power source was operated at 115.6 volts, 60.0 hertz, 0.2 percent voltage THD. FIG. 10 shows the dc current injection, $I_{dc}$, relative to the load current, $I_{ac}$, as a percentage on the horizontal axis. The vertical axis is the total harmonic distortion of the current flowing into the transformer, THD, and the second harmonic magnitude of the same current. As can he seen, both the THD and the second harmonic magnitude are minimized when the dc injection is substantially zero.

Figure 11:
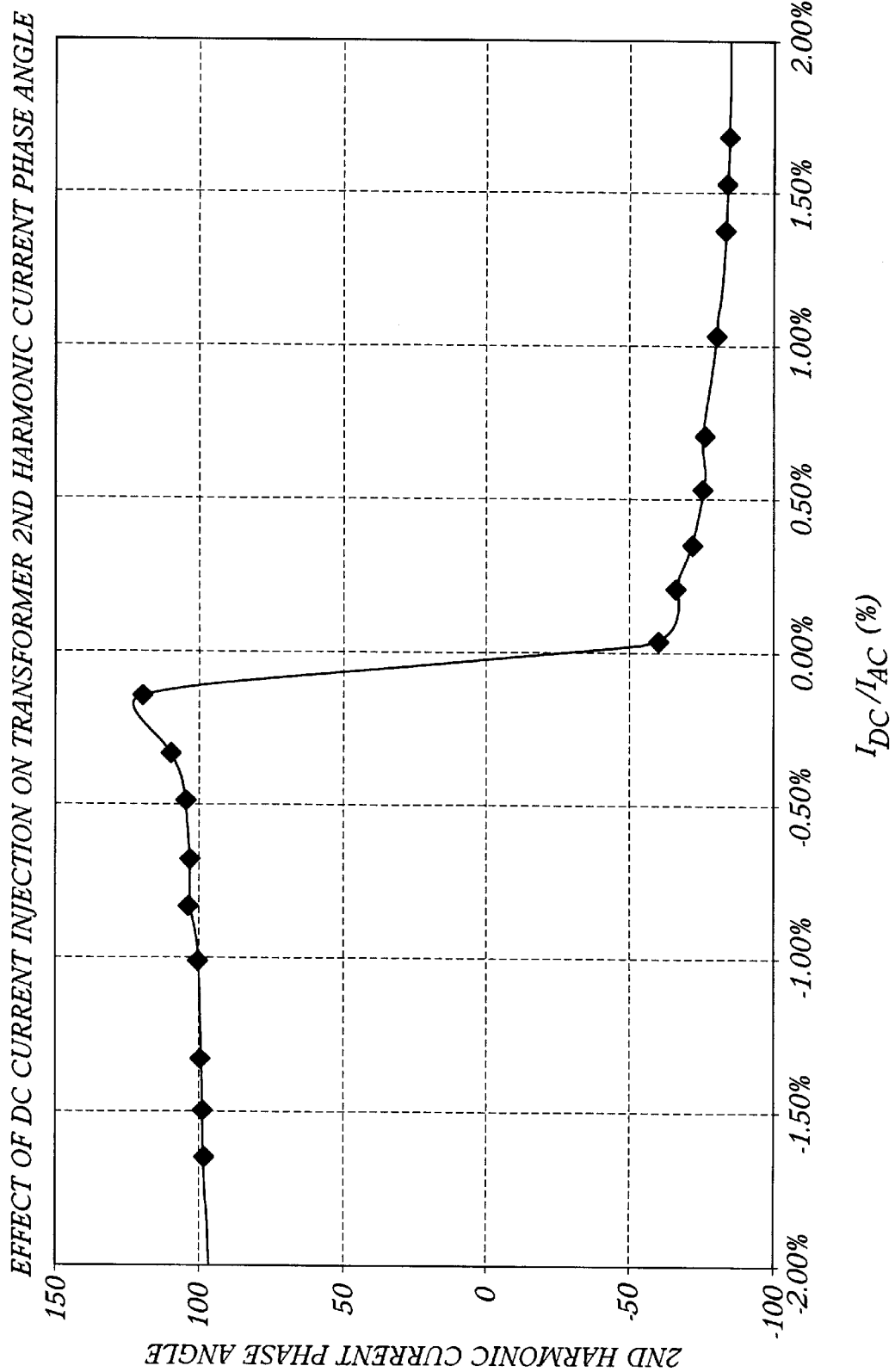
FIG. 11 is a graphical representation of results of an experiment showing the phase angle of the second harmonic current injected into a voltage transformer as a function of dc current injection into the voltage transformer.

FIG. 11 illustrates the phase angle of the second harmonic current into the transformer during the experiment discussed in connection with FIG. 10. Significantly, there is a large phase shift near zero dc current injection (and it is believed that the curve docs not cross zero phase angle at zero dc current injection due to minor measurement errors in the instrumentation).

The inventor understands that it is often easier and more effective to implement a control system with a linearized parameter rather than attempting to minimize the value of a function. In this regard, FIG. 12 is a plot of the linearized second harmonic as a function of dc current injection in a voltage transformer. Because the second harmonic measurement comprises a complex number (i.e., magnitude and phase angle), it is linearized by the following function (as was done for the plot in FIG. 12):

$$2^{nd} \text{ Harmonic linearized} = 2^{nd} \text{ Harmonic Magnitude} * \sin(\text{phase angle})$$

When even harmonics are present in current, the second harmonic is the preferred harmonic to measure during operation of the present invention because it is typically the largest in magnitude of the even harmonics.

Since numerous modifications and combinations of the above method and embodiments will readily occur to those skilled in the art it is not desired to limit the invention to the exact construction and processes shown and described above. For example, it should be understood that the elements of the control systems shown in FIGS. 1–5 can be separate components or may readily be combined into modules. For example the control system 20 of FIG. 1 may be configured to interconnect a module that comprises the power converter 22 including the reference device 24 and the controller 40 of the feedback control loop 30, a module that contains the other components of the feedback control loop 30, and the voltage transformer 26. Accordingly resort may be made to all suitable modifications and equivalents that fall within the scope of th e invention as defined by the claims which follow. The words "comprise?," "comprises," comprising "include(s)," and "including" when used in this specification and in the following claims are intended to specify the presence of stated features or steps, but they do not preclude the presence or addition of one or more other features, steps, or groups thereof.

What is claimed is:

1. A control system for providing an electrical connection between a power source and a utility connection or ac loads and controlling the quantity of dc currents and the amplitude of even harmonic currents in the power output of the power source,the control system comprising:

a power converter connected to the power source for receiving the power output of the power source, converting the power output to a converted power selected for transmittal to the utility connection or the ac loads, and transmitting the converted power on an outlet lead of the power converter;

a voltage transformer connected to the outlet lead of the power converter for receiving the converted power to at least partially block dc current in the converted power and for transmitting the dc blocked, converted power on a control system outlet lead to the utility connection or the ac loads;

a feedback control loop for measuring even harmonic currents entering the voltage transformer and transmitting a control signal based on the measured even harmonic currents wherein the control signal adjusts the shape of the converted power to limit dc current injection into the voltage transformer; and means for adjusting the shape of the converted power in response to the control signal.

2. The control system of claim 1, wherein the adjusting means comprises a reference device for receiving the control signal and transmitting a reference signal with a dc offset, the power converter being operatively responsive to the reference signal to change the shape of the converted power, whereby the quantity of dc current in the converted power is limited to control the amplitude of even harmonic currents transmitted on the control system outlet lead.

3. The control system of claim 2, wherein the adjusting means and the power converter are combined to form an integrated power converter with dc offset adjustment.

4. The control system of claim 1, wherein the feedback control loop comprises a harmonic analyzer for determining magnitudes and phases of second harmonic currents in the measured even harmonic currents.

5. The control system of claim 4, wherein the feedback control loop further includes a controller for processing the magnitudes and phases of the second harmonic currents determined by the harmonic analyzer to determine a control dc offset required to substantially zero a linearized function of the second harmonic currents magnitudes, the control dc offset being included in the control signal.

6. The control system of claim 4, wherein the feedback control loop further includes a controller for processing the magnitudes and phases of the second harmonic currents determined by the harmonic analyzer to determine a control dc offset required to substantially minimize the magnitude of the current total harmonic distortion in the converted power, the control dc offset being included in the control signal.

7. The control system of claim 4, wherein the feedback control loop further includes a controller for processing the magnitudes and phases of the second harmonic currents determined by the harmonic analyzer to determine a control dc offset required to substantially minimize the magnitude of the second harmonic current entering the voltage transformer, the control dc offset being included in the control signal.

8. The control system of claim 4, wherein the harmonic analyzer further receives a synchronizing signal for use in determining the fundamental system frequency on the utility connection.

9. The control system of claim 4, wherein the feedback control loop further comprises a current transformer connected to the control system outlet lead for sensing currents between the voltage transformer and the utility connection or ac loads and for transmitting an output signal including sensed current information to the harmonic analyzer.

10. The control system of claim 4, wherein the feedback control loop further comprises a current transformer connected to the outlet lead of the power converter for sensing currents between the power converter and the voltage transformer and for transmitting an output signal including sensed current information to the harmonic analyzer.

11. The control system of claim 4, wherein the feedback control loop further comprises a first current transformer connected to the outlet lead of the power converter for sensing currents between the power converter and the voltage transformer and for transmitting an output signal including sensed current information and a second current transformer connected to the control system outlet lead for sensing currents between the voltage transformer and the utility connection or ac loads and for transmitting an output signal including sensed current information.

12. The control system of claim 11, wherein the feedback control loop further includes a signal combining device for receiving, and combining the output signals from the first and second current transformers to create a combined signal representing the load current of the voltage transformer, whereby the signal to noise ratio for determining amplitudes of the measured even harmonic currents is enhanced, the combined signal being transmitted to the harmonic analyzer.

13. The control system of claim 12, wherein the first and second current transformers and the signal combining device are combined to form an integrated current transformer adapted for sensing currents flowing through the voltage transformer and outputting a signal representative of the sensed currents in the voltage transformer.

14. The control system of claim 1, wherein the power converter is a dc to ac inverter.

15. The control system of claim 1, wherein the power converter is an ac to ac converter.

16. The control system of claim 1, wherein the feedback control loop is further adapted for measuring currents entering the voltage transformer and determining the total harmonic current distortion and harmonic amplitudes of the measured current.

17. A control system for controlling dc current and even harmonic current injection into a utility or ac loads from a power source, the control system comprising:
   a power converter positioned between the power source and the utility and ac loads for receiving output power from the power source and converting the output power into a converted power suited for the utility or the ac loads and with dc current magnitudes and even harmonic currents less than a dc current injection limit and an even harmonic current amplitude limit; and
   means for controlling operation of the power converter to adjust the shape of the converted power to limit the dc current magnitudes and the even harmonic current amplitudes.

18. The control system of claim 17, wherein the controlling means includes a reference device that functions to transmit a reference signal with a dc offset to the power converter, whereby the operation of the power converter is controlled to provide dc current magnitudes and even harmonic current amplitudes responsive to the dc offset.

19. The control system of claim 18, wherein the dc offset of the reference signal is selected based on measurements of even harmonic currents in the converted power.

20. The control system of claim 19, wherein the dc offset of the reference signal is selected by the combined operation of a harmonic analyzer and a controller adapted for determining magnitudes and phases of second harmonic currents measured in the converted power and for selecting the dc offset to substantially zero a linearized function of the second harmonic current magnitudes.

21. The control system of claim 17, further including a voltage transformer electrically connected between the power converter and the utility and ac loads.

22. A method for controlling dc current injection and even harmonic current injection into a utility from a power source, comprising:
   electrically connecting a power converter to an outlet lead of the power source and an inlet lead of the utility;
   operating the power converter as an ac power source to receive power from the power source, to convert the power to ac current, and to transmit the ac current on the inlet lead to the utility;
   measuring the even harmonic currents in the ac current on the utility inlet lead; and
   supplying a reference signal to the power converter to control the shape of the ac current on the utility inlet lead, the reference signal including a dc offset based on the measured even harmonic currents, wherein the power converter uses the reference signal to adjust the shape of the ac current to limit the dc current injection on the utility inlet lead.

23. The method of claim 22, further including electrically connecting a voltage transformer adapted for blocking dc current between the power converter and the utility on the utility inlet lead.

24. The method of claim 23, wherein the measuring is performed to measure the even harmonics entering the inlet and the outlet of the voltage transformer.

25. The method of claim 24, further including combining the measured even harmonic currents at the inlet of the voltage transformer with the measured even harmonic currents at the outlet of the voltage transformer and determining the magnitudes and phases of second harmonic currents in the combined measured even harmonic currents.

26. The method of claim 25, further including processing the determined magnitudes and phases of the second harmonic currents to determine the dc offset wherein the dc offset is determined to substantially zero a linearized function of the second harmonic current magnitudes.

27. The method of claim 23, wherein the measuring is performed to measure the even harmonics entering the inlet of the voltage transformer.

28. The method of claim 23, wherein the measuring is performed to measure the even harmonics entering the outlet of the voltage transformer.

* * * * *